US008140761B2

(12) United States Patent
Ekanadham et al.

(10) Patent No.: US 8,140,761 B2
(45) Date of Patent: Mar. 20, 2012

(54) EVENT TRACKING HARDWARE

(75) Inventors: Kattamuri Ekanadham, Mohegan Lake, NY (US); Il Park, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/630,946

(22) Filed: Dec. 4, 2009

(65) Prior Publication Data
US 2011/0138125 A1 Jun. 9, 2011

(51) Int. Cl.
*G06F 12/00* (2006.01)

(52) U.S. Cl. ........ 711/123; 711/133; 711/156; 711/159; 711/221; 702/127; 710/18; 714/39; 719/318

(58) Field of Classification Search .................. 711/123, 711/133, 156, 159, 221; 702/127; 710/18; 714/39; 719/318
See application file for complete search history.

(56) References Cited

U.S. PATENT DOCUMENTS

| 6,415,358 | B1 * | 7/2002 | Arimilli et al. | 711/134 |
| 6,741,558 | B1 * | 5/2004 | Gresham | 370/230 |
| 7,127,561 | B2 * | 10/2006 | Hill et al. | 711/145 |
| 7,447,946 | B2 * | 11/2008 | McHale et al. | 714/45 |
| 7,822,926 | B2 * | 10/2010 | Croxford et al. | 711/129 |
| 8,041,897 | B2 * | 10/2011 | Biles et al. | 711/133 |
| 2002/0184568 | A1 | 12/2002 | Kurrasch | |
| 2007/0067773 | A1 | 3/2007 | Hope et al. | |
| 2007/0276631 | A1 * | 11/2007 | Subramanian et al. | 702/186 |
| 2008/0177756 | A1 | 7/2008 | Kosche et al. | |
| 2011/0131588 | A1 * | 6/2011 | Allam et al. | 719/318 |

OTHER PUBLICATIONS

Roth et al., Performance Monitoring on the PowerPC™ 604 Microprocessor, published by IEEE in the Proceedings of ICCD 1995.

* cited by examiner

*Primary Examiner* — Stephen Elmore
(74) *Attorney, Agent, or Firm* — Ryan, Mason & Lewis, LLP

(57) ABSTRACT

An event tracking hardware engine having N ($\geq 2$) caches is invoked when an event of interest occurs, using a corresponding key. The event tracking engine stores a cumulative number of occurrences for each one of the different kinds of events, and searches in the N caches for an entry for the key. When an entry for the key is found, the engine increments the number of occurrences if no overflow of the cumulative number of occurrences would occur. However, if the incrementing would cause overflow, then instead of incrementing the cumulative number of occurrences, the engine promotes the entry for the event of interest to a next higher cache.

24 Claims, 11 Drawing Sheets

FIG. 2 find(i, key) = {search the set in Ci corresponding to key, for a matching entry;
return matched entry or else null} findFree(i, key) = {search the set in Ci corresponding to key, for a free entry.
return a free entry or null} findVictim(i, key) = {search the set in Ci corresponding to key, for a random entry.
(a simple round-robin is sufficient) return the selected entry}

FIG. 3

```
promote(i, key) = { e = find(i,key);
    if (e = null) { f =findFree(i,key);
        victim = InvalidEntry;
        if (f = null) {f = findVictim (i,key); copy contents of f into victim}
        replace f with [valid, tag, 0] where tag is derived from key,
        return victim}
    if (e != null) {
        if (e.freq + 1 < 2**k) {e.freq + +; return InvalidEntry}
        if (e.freq + 1 = 2**k) and (i =n) return InvalidEntry;
        if (e.freq + 1 = 2**k) and (i<n) {
            g = promote(i + 1, key);
            if (g != null) set g.freq = 2**k - 1;
            replace e with g;
            return InvalidEntry}
    }
}
```

FIG. 4
PRIOR ART

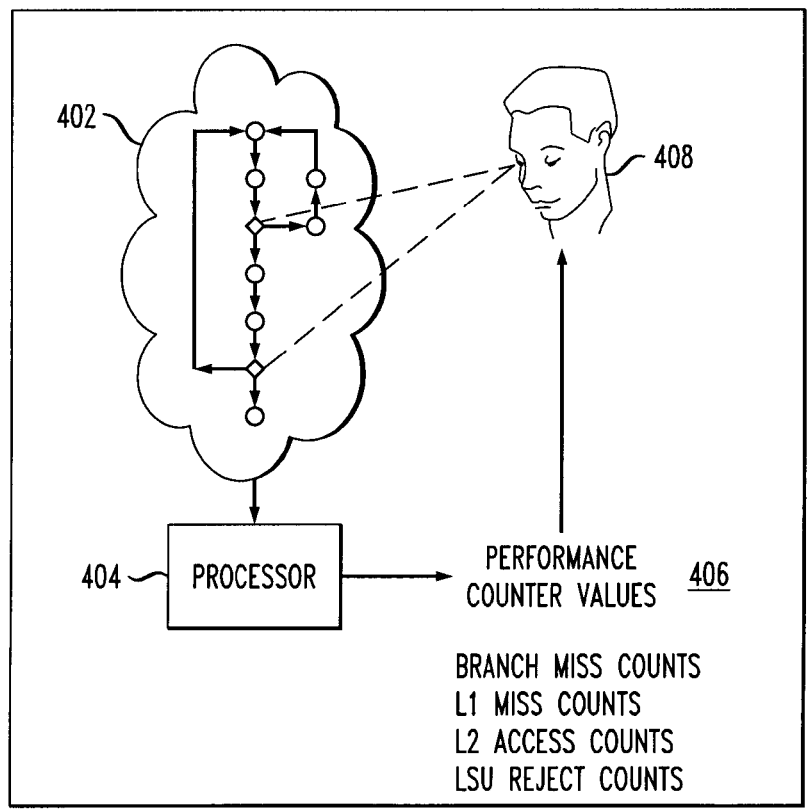

PERFORMANCE
COUNTER VALUES  406

BRANCH MISS COUNTS
L1 MISS COUNTS
L2 ACCESS COUNTS
LSU REJECT COUNTS

US 8,140,761 B2

EVENT TRACKING HARDWARE

FIELD OF THE INVENTION

The present invention relates to the electrical, electronic and computer arts, and, more particularly, to computer architecture, autonomic computing, and the like.

BACKGROUND OF THE INVENTION

Computer architecture refers to the basic design and operational structure of a computer system. Attention is typically given to the manner in which the central processing unit (CPU) performs internally and accesses addresses in memory. Autonomic computing seeks to develop computer systems capable of self-management. A common facility desired in performance analysis of computer (and other) systems is to know how frequently a certain event takes place (e.g., in an execution, so that something can be done if that event is related to some performance bottleneck).

SUMMARY OF THE INVENTION

Principles of the invention provide techniques for event tracking hardware.

In one aspect, an exemplary embodiment of a method includes the steps of detecting multiple occurrences of a plurality of different kinds of events of interest; and upon each of the occurrences, invoking an event tracking hardware engine having N caches, N being at least two, using a key of a type corresponding to a corresponding one of the kinds of events, such that the event tracking hardware engine stores, for each of the different kinds of events, a corresponding cumulative number of occurrences, by carrying out additional steps. The additional steps include searching in the N caches for an entry for the key; if an entry for the key is found, and no overflow of the corresponding cumulative number of occurrences for the entry for the key would occur by incrementing the corresponding cumulative number of occurrences, incrementing the corresponding cumulative number of occurrences; if the entry for the key is found, and overflow of the corresponding cumulative number of occurrences for the entry for the key would occur by incrementing the corresponding cumulative number of occurrences, promoting the entry from a given one of the caches in which the entry exists to a next highest cache; and if the entry for the key is not found, entering the entry for the key in a zeroth one of the caches with the corresponding cumulative number of occurrences being initialized.

In another aspect, an exemplary embodiment of an event tracking engine apparatus includes a plurality of caches and a corresponding plurality of control circuits. The plurality of caches and the corresponding plurality of control circuits are cooperatively configured to receive indications of multiple occurrences of a plurality of different kinds of events of interest, the indications being received as keys; and to store a corresponding cumulative number of occurrences for each of the different kinds of events of interest, by carrying out the above-mentioned additional steps upon receipt of each given one of the keys.

In yet another aspect, an exemplary embodiment of a method includes the steps of detecting multiple occurrences of a plurality of different kinds of events of interest; and upon each of the occurrences, invoking an event tracking hardware engine having N caches, N being at least two, using a key of a type corresponding to a corresponding one of the kinds of events, such that the event tracking hardware engine stores, for each of the different kinds of events, a corresponding cumulative number of occurrences, by carrying out additional steps. The additional steps include searching in a zeroth one of the caches for an entry for the key; if an entry for the key is found in the zeroth one of the caches, and no overflow of the corresponding cumulative number of occurrences for the entry for the key would occur by incrementing the corresponding cumulative number of occurrences, incrementing the corresponding cumulative number of occurrences; if the entry for the key is found in the zeroth one of the caches, and overflow of the corresponding cumulative number of occurrences for the entry for the key would occur by incrementing the corresponding cumulative number of occurrences, promoting the entry from the zeroth one of the caches in which the entry exists to a next highest cache; and if the entry for the key is not found, entering the entry for the key in the zeroth one of the caches with the corresponding cumulative number of occurrences being initialized.

In still another aspect, an exemplary embodiment of an event tracking engine apparatus includes a plurality of caches and a corresponding plurality of control circuits. The plurality of caches and the corresponding plurality of control circuits are cooperatively configured to receive indications of multiple occurrences of a plurality of different kinds of events of interest, the indications being received as keys; and to store a corresponding cumulative number of occurrences for each of the different kinds of events of interest, by carrying out the above-mentioned additional steps upon receipt of each given one of the keys.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 2 shows exemplary functions that perform operations on a cache;

FIG. 3 shows an exemplary "promote" function, according to another aspect of the invention;

FIG. 4 shows event tracking using performance counters implemented via code instrumentation, according the prior art;

DETAILED DESCRIPTION OF PREFERRED EMBODIMENTS

Figure 1:
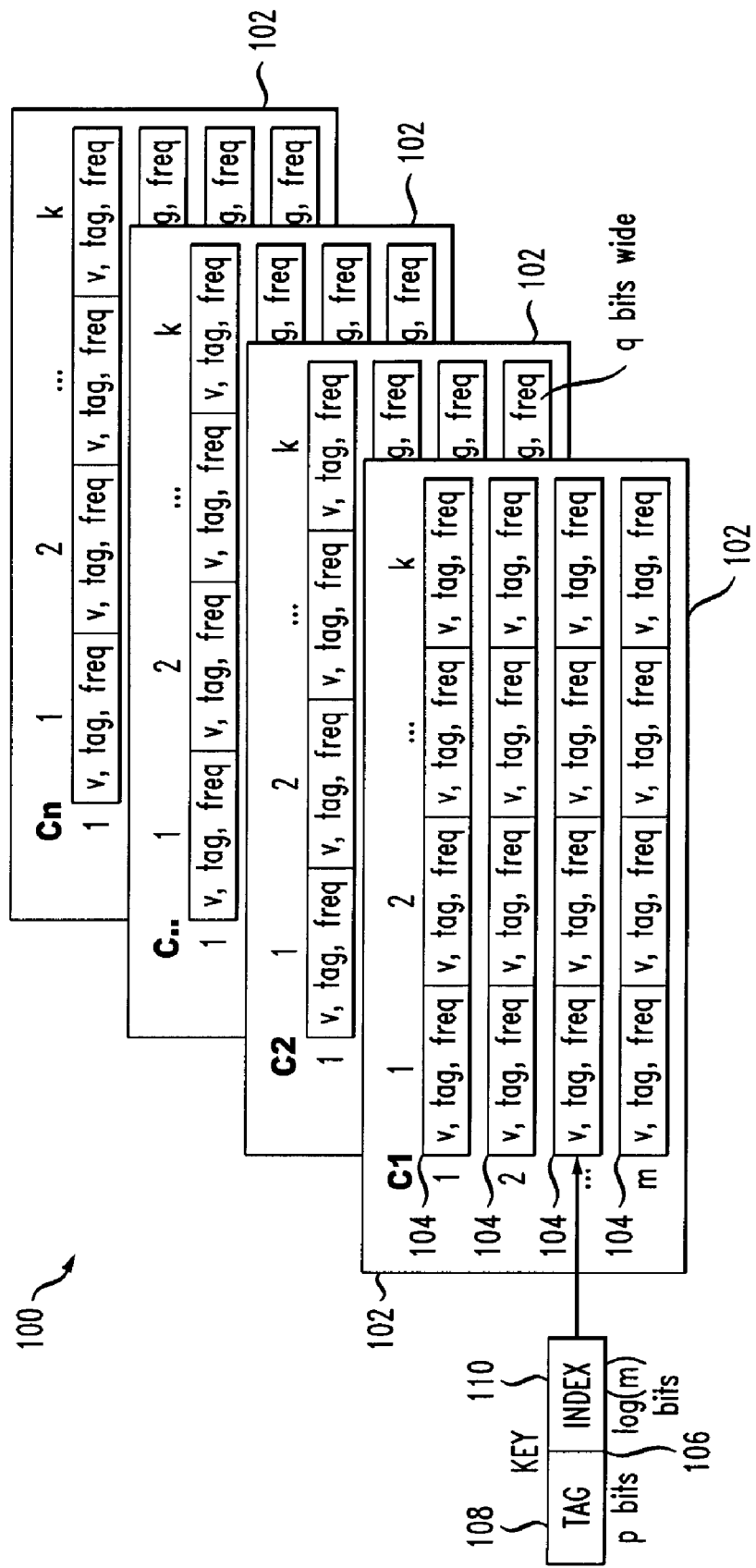
FIG. 1 shows an exemplary array of caches, according to an aspect of the invention.

Aspects of the invention provide a general purpose hardware engine that can be used to track popular events, where an event is characterized by a key and popularity is characterized by high frequency of occurrence in a statistical sense. In one or more embodiments, the domain of events, (i.e. the key size) handled by the engine can be very large, and each time an event occurs, the engine is invoked with the corresponding key. In one or more instances, the engine internally tracks the frequency of the most popular events, and at any time, the engine can be asked to produce the popular events (as seen up to that time). One or more embodiments of the engine are very efficient, compact and general enough that they can be employed for tracking a variety of events. At least some embodiments of the engine are very useful in autonomic systems that constantly monitor events to track the health of a system and take action when they observe inappropriate growth of frequency in certain events.

A common facility desired in performance analysis is to know how frequently a certain event takes place in an execution, so that something can be done if that event is related to some performance bottleneck. A feature that picks the top few of the most frequently occurring events, among a given class of events, may also be desirable in some instances. One way to accomplish this is to represent an event by some unique key and maintain a table of <key, frequency> pairs and compute the histogram, by incrementing the frequency of a key whenever the corresponding event occurs. At the end, the table can be sorted by the frequency and the top few most frequently occurring events. Such a histogram may be valuable, if it is provided in real time and can be produced in hardware with very little overhead for the rest of the computation that takes place. However, often the domain of keys is extremely large and keeping large tables in hardware and sorting them in real time cannot be afforded. Hence, resort to finite tables will be required, and some accuracy will be lost as approximations are provided. A naïve solution is to use a table to store only a finite portion of the histogram at any time and take up some reasonable strategy to evict entries under pressure. When an event occurs, the table is searched for its key. If present, the frequency is incremented. Otherwise, the least recently accessed entry in the table is replaced with an entry for the new reference. The table may be in random access memory or in a content addressable memory. However, this strategy does not, in general, track frequently occurring events if they occur with longer interval arrival times. One or more embodiments of the invention provide a strategy to balance the trade off between space-time complexity and the objective of keeping the most frequently occurring events as much as possible. In one or more instances, the strategy works statistically well.

One or more embodiments provide a general purpose hardware engine that can be used to track popular events, where an event is characterized by a key and popularity is characterized by high frequency of occurrence in a statistical sense. In at least some instances, the domain of events (i.e. the key size) handled by the engine can be very large. Each time an event occurs, the engine is invoked with the corresponding key. The engine internally tracks the frequency of the most popular events. At any time, the engine can be asked to produce the popular events (as seen up to that time). One or more embodiments of the engine are very efficient, compact and general enough that they can be employed for tracking a variety of events. The exemplary engine is useful in autonomic systems that constantly monitor events to track the health of a system and take action when they observe inappropriate growth of frequency in certain events.

Aspects of the invention collect raw event counts efficiently and accurately, digest quickly, and produce meaningful and useful profiles with a restricted amount of hardware resources. One or more embodiments provide a technique to extract most frequently occurring events out of a set.

One or more embodiments provide an engine whose size and structure can be tailored to specific systems, as it is conveniently parameterized as shown in FIG. 1. The parameters [n,m,k,p,q] are as described below. The engine includes an array 100, Ci, of i=1 . . . n, caches 102, each cache being organized as an indexable array of m sets 104, each of associativity k. A key 106 is split into two parts: a tag 108 (p bits wide) and an index 110 (log(m) bits wide), so that the index is used to access one of the m sets 104 in the cache. Each cache entry contains a valid bit v, the tag and a frequency, which is q bits wide. The index and the tag uniquely determine the key and the frequency indicates how many times the corresponding event occurred. Since the frequency is q bits wide, an entry can count up to ($2**q$) occurrences of an event.

The first occurrence of an event creates an entry in C1 with its key. Its frequency is set to 0 (counting up from zero as is standard in computer math). Its subsequent occurrences increment its frequency in C1 until it reaches the maximum. At the next occurrence (i.e. occurrence number ($1+2q$)), its entry in C1 gets deleted and an entry is created for it in C2 with frequency 0. This is referred to herein as promotion from level 1 to level 2. The next occurrence of that event again creates a new entry in C1 with frequency 0. Further occurrences increment the count in C1 only. Finally when occurrence number ($1+2(q+1)$) takes place, its entry in C1 gets deleted and the frequency in its entry in C2 is incremented to 1. This process repeats as necessary. Thus, in general, if there is an entry in Ci with frequency value f, then the event must have occurred at least $(1+f)(2**((i-1)q))$ times. Since, at any time, a key may be present in one or more caches, a lower bound on its frequency can be computed by the sum of the above terms for each cache in which the key is present.

For illustrative purposes, assume the standard functions, shown in FIG. 2, that perform conventional operations on a cache. Define the technique to carry out the frequency update as follows: The function promote(i, key), which takes a cache level i and a key as arguments, is used to promote the count from one level to the next level. Thus when the count at level i saturates, Ci invokes this function to promote the count to Ci+1. As a result, the entry in Ci could be vacated and possibly a new entry may be created in Ci+1. Sometimes, when the set in Ci+1 is full, one or more entries may have to be evicted from it to create a new entry. In this case, the victim entry is returned (result value of the promote function) to Ci, so that it can occupy the vacated place (with its frequency set to maximum at this lower level) although this will result in losing some of the count the event has accumulated. In this manner, one or more embodiments of the engine balance the tradeoff and attempt to remember the popular events in a statistical manner.

The boundary cases are handled as follows. When an event has to be promoted from Cn to Cn+1, the promotion is simply ignored and the entry remains at Cn and loses its count beyond the maximum. Similarly, the arrival of an event notification to the engine is considered as a promotion from a fictitious level C0 into C1. If C1 returns a victim evicted at C1, it is ignored. This means that at level 1 event occurrences compete with each other and losers will be ignored. Since the weight of a count at level 1 is relatively small, this will not result in great loss. The weight of the count at higher levels gradually increases and the engine takes care in preserving it, and if the engine needs to evict at a higher level, it attempts to retain some of the accumulated count by demoting the event to a lower level. The complete specification of the promote function is given in FIG. 3.

To read the most popular events, the contents of the caches can be listed in sorted order, first by the level of the cache (highest level first) and within each level, by the frequency (highest frequency first). Given the teachings herein, the skilled artisan will appreciate that several variations of the basic concept described above are possible in order to tailor to specific needs in a system. For instance, the caches at different levels may have different sizes. The bit widths for frequencies can be lowered at higher levels. Similarly, a variety of criteria may be adapted for victim selection in a set, for example:

(a) pure round-robin,
(b) pick the entry with least frequency,
(c) pick the entry that was least recently referred to, or
(d) pick the entry that has least frequency and least reference count, in that order.

In one or more embodiments, the hardware complexity increases from (a) through (d), while it is believed that, in at least some instances, the performance benefit may also increase to some extent.

By way of review and provision of additional detail, heretofore, event tracking has employed use of performance counters implemented via code instrumentation. As seen in FIG. 4, engineer 408 must instrument the code (represented by flow chart 402), run the program on the processor 404, and collect the counters as shown at 406. The engineer must then guess at, and fix, the problem area, and run the program again. Unfortunately, the counters do not indicate the problem area or other attributes of the problem. One example of a prior art system is described in "Performance Monitoring on Power PC 604 Microprocessor," by Roth et al., published by IEEE in the Proceedings of ICCD 1995. Note that L1 and L2 are, respectively, a level 1 cache and a level 2 cache; while LSU refers to the load store unit in the central processing unit (CPU).

Figure 5:
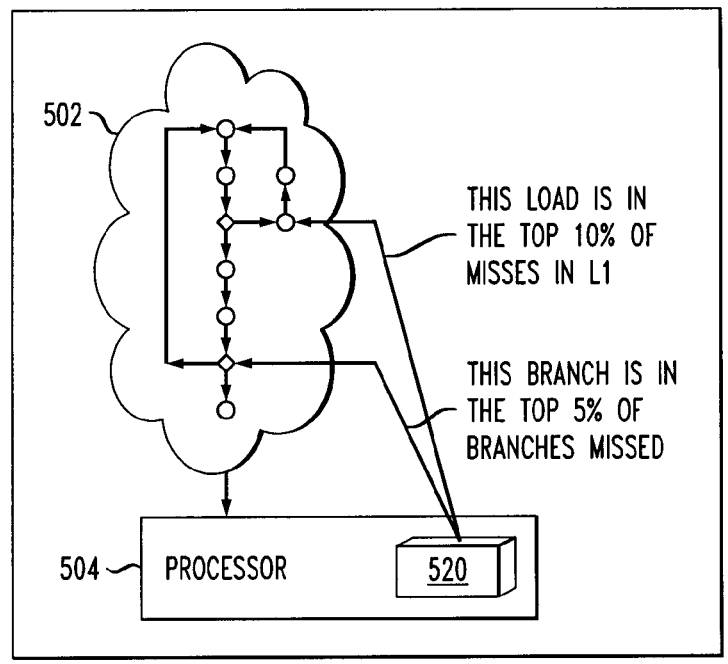
FIG. 5 shows use of exemplary event tracking hardware, according to yet another aspect of the invention.

With reference now to FIG. 5, event tracking hardware 520 in processor 504 locates performance hotspots in code 502. Frequently occurring events are pinpointed, including, by way of example and not limitation, events such as cache and/or branch misses. For the events of interest, the instruction and/or data addresses are identified. The frequency of the events is statistical in nature, and a flexible interface is provided. In particular, hardware 520 can be used to determine the most frequent events of any kind, such as cache misses, branch mis-directions, or indeed to events not related to computers at all; for example, results of various events or experiments. Furthermore, a mechanism can be provided to select a subset of events by filtering an attribute or attributes. For example, hardware 520 could be employed to determine the most frequent results of certain events, and then a filter could be applied; for example, to consider only events occurring on Monday.

Figure 6:
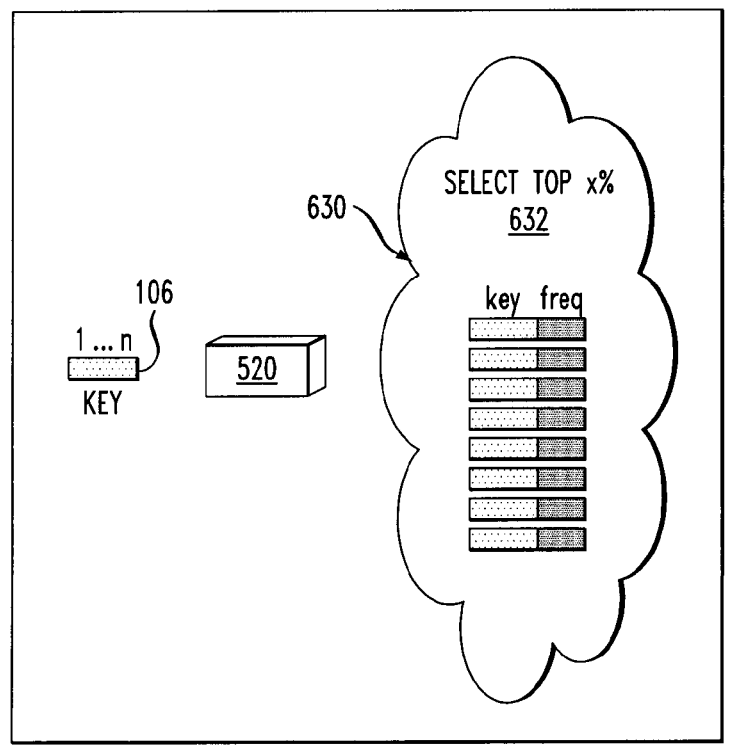
FIG. 6 shows an exemplary operational view of the event tracking hardware.

An exemplary operational view will now be provided with respect to FIG. 6. Consider an abstract-away notion of an event. The domain of events is defined by n-bit key 106. Each key value identifies a distinct event. Each occurrence of an event generates an instance of the corresponding key. A sequence of events generates a corresponding stream of keys. Event tracking hardware 520 acts on the key stream. It remembers keys and their frequencies in a table 630. Each incoming key searches the table. If a corresponding entry for the key is found, the frequency for that key is incremented. If the key is not found, it is entered with a frequency of zero (again, using the computer math convention of counting up from zero). The table is sorted in order of frequency of occurrence. At any time, the top x % of keys in the box can be read out, as seen at 632.

Figure 7:
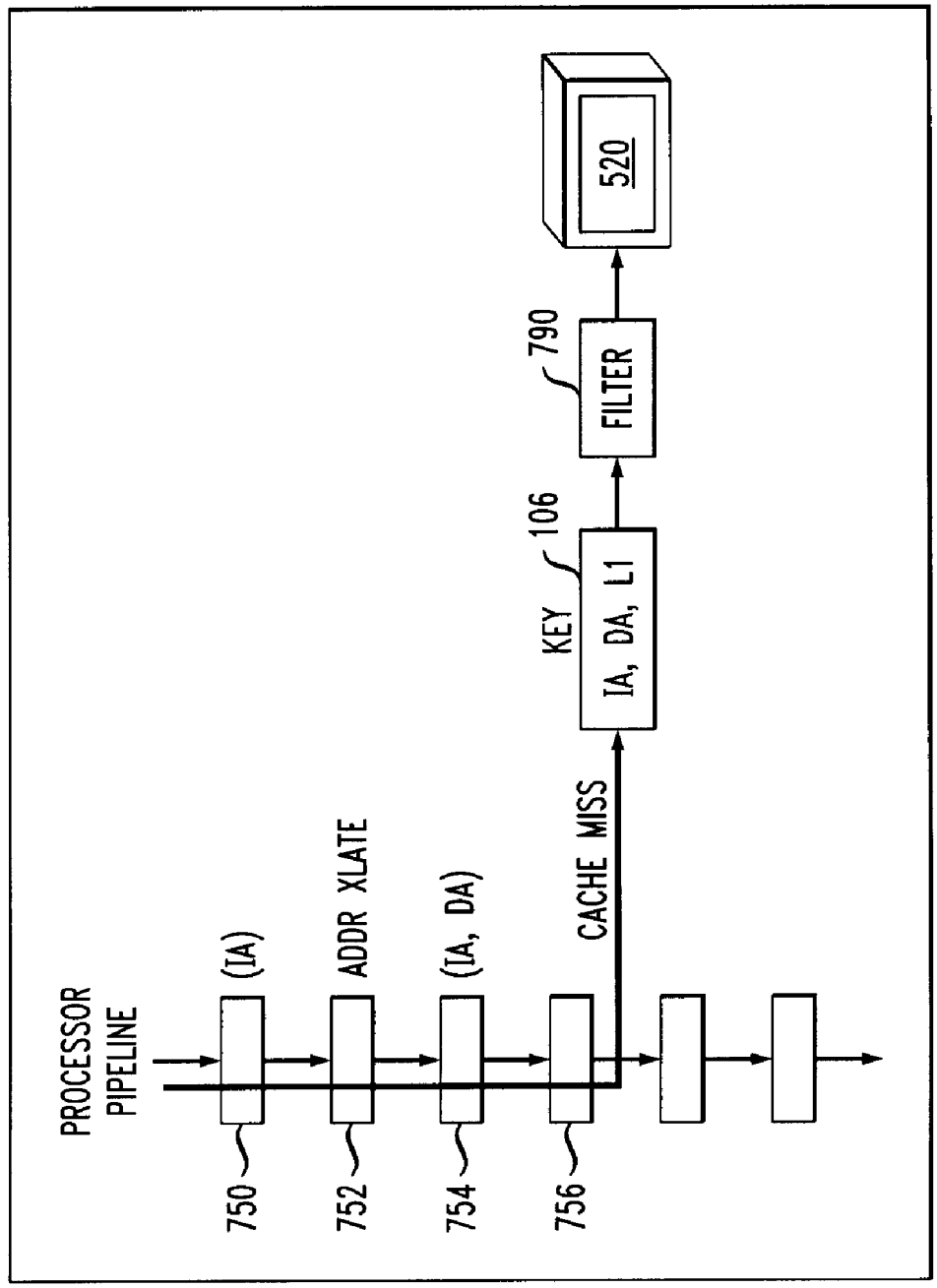
FIG. 7 shows exemplary tracking using the event tracking hardware.

A non-limiting example will now be presented with respect to FIG. 7. Consider the tracking of L1 misses. Tracking hardware 520 is initialized for a key space, where a key has the parameters:

<IA, DA, cache level indicator>

Consider the processor pipeline depicted in FIG. 7. As seen at 750, the instruction packet carries the instruction address (IA) with it. Address translation takes place at 752, and 754, both the IA and the data address (DA) are known. When a cache miss is detected at 756, compose key 106 with IA, DA and L1 (cache level 1, in this exemplary instance) indicators. The key 106 is sent to the event tracking hardware 520. The values of IA and DA can contribute to composing the key, which in general can be composed arbitrarily.

Many other variations are possible. For example, it is possible to install filters for keys, and/or to select only certain address ranges. In at least some instances, a key may not need the DA. By way of an example, consider IA, DA and L1 cache misses, where the L1 cache misses are only of interest for instructions in a certain range. The address range of interest can be specified (e.g., between address A and address B), and when the key comes in, it is fed to the counter only if the IA falls between A and B. In mathematical terms, there is a predicate function which yields a value of either true or false. This function is applied to the incoming event and if true, the event is fed to the counter; otherwise, it is discarded. Filtering can be implemented in a filter 790 between the events and the counter (i.e., event tracking hardware 520). A hardware comparator is one example of a suitable filter.

Figure 8:
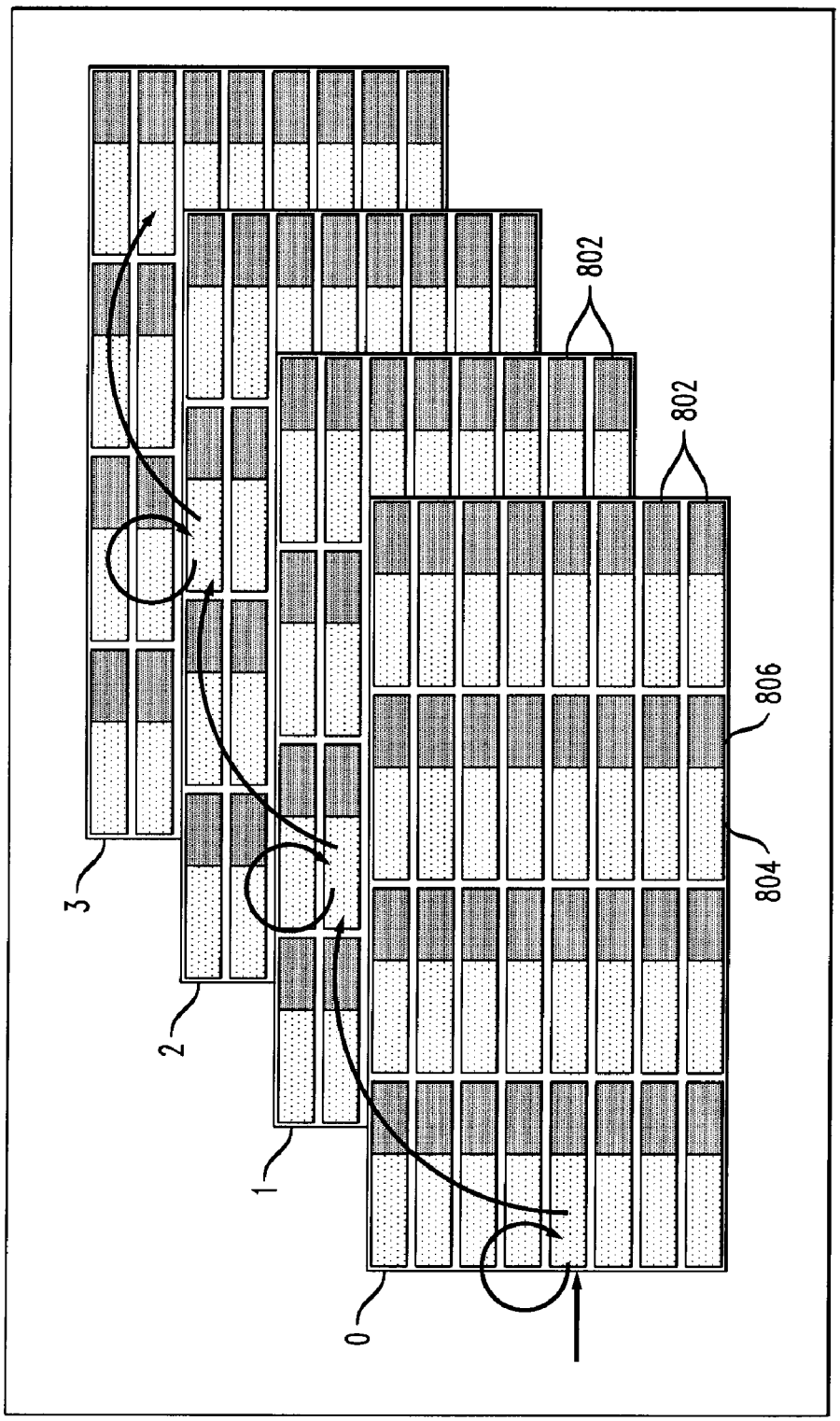
FIG. 8 shows an exemplary schema for entering keys into a table, according to a further aspect of the invention.

With reference to FIG. 8, in an exemplary first schema, the table is implemented as an associative cache, and multiple tables (e.g., 0, 1, 2, and 3) may be employed, as discussed below. Each entry 802 corresponds to a unique key and includes the key's frequency. A given table is accessed by hashing on the key (the skilled artisan will of course be familiar with the use of a hash function to convert a large amount of data into a small datum, typically an index to an array; for example, to speed up table lookup or data comparison tasks). Thus, each entry 802 has a tag 804 (like tag 108 discussed above) and a frequency 806. A search of the table may return a hit or a miss. To retain entries with a higher frequency, the exemplary hardware event tracker 520 uses an array of tables 0, 1, 2, and 3, in the non-limiting example. The structure of each table is the same. A given key exists at most in one table. An incoming key 106 is preferably searched in all caches (i.e., tables 0, 1, 2, and 3) in parallel. When a hit takes place, the frequency for that key is incremented. Upon frequency overflow, exit the current level (e.g., level 0) and enter the next level (e.g., level 1). When a miss takes place, the key is not yet present, so it is entered at level 0. To enter a given level (e.g., 0, 1, 2, and 3) find a free entry 802. If none exists, evict the least frequent entry 802 and set the frequency to zero.

It will be appreciated that with an n-bit wide field, an entry at level i with frequency f has a frequency of at least $f+1+(i)$ $(2^n)$. Entries at higher levels have higher frequencies. Upon contention, lower frequency entries lose. A variant is to demote instead of evict, so that only an entry at the lowest level is evicted at any time (this may result in a cascade).

Figure 9:
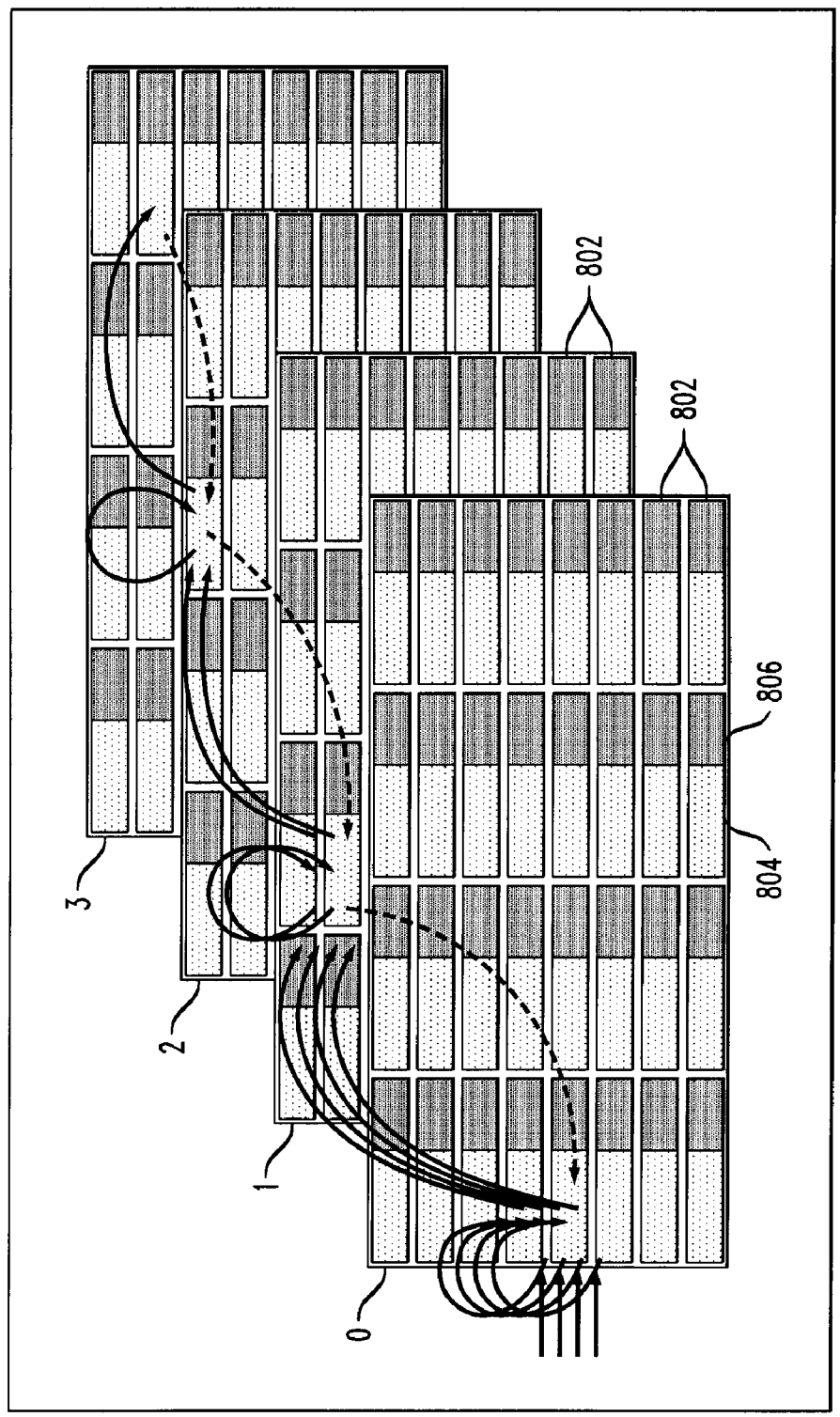
FIG. 9 shows another exemplary schema for entering keys into a table, similar to that described with respect to FIG. 1, according to an even further aspect of the invention.

With reference to FIG. 9, in an exemplary second schema, an incoming key 106 always enters at level 0. Elements in FIG. 9 numbered similarly to element in FIG. 8 are analogous thereto. When frequency overflows at a level, the entry gets promoted to the next level (e.g., level 0 to level 1). Upon promotion, the next level is checked for the same key (since here, a key always enters at level 0). If there is a hit, its frequency is incremented; upon frequency overflow, promote the entry to the next level. If there is a miss, find a free entry 802 (if none is available, demote the lowest frequency entry) and enter with frequency zero. The entry that is demoted replaces the promoted entry. With an n-bit wide field, an entry at level i with frequency f has a frequency of at least $(1+f)2^{**}(i*n)$. In this schema, an entry may be present at multiple levels at any time.

Examples of variants include victim selection, LRU (least recently used), random, and LFU (least frequently used)+ LRU (least recently used). These will be per se familiar to the skilled artisan, who will be able, given the teachings herein, to adapt one or more for use with one or more embodiments of the invention. In at least some instances, entries that have a promoted entry are marked, and unmarked entries are preferred over marked entries in victim selection.

Figure 10:
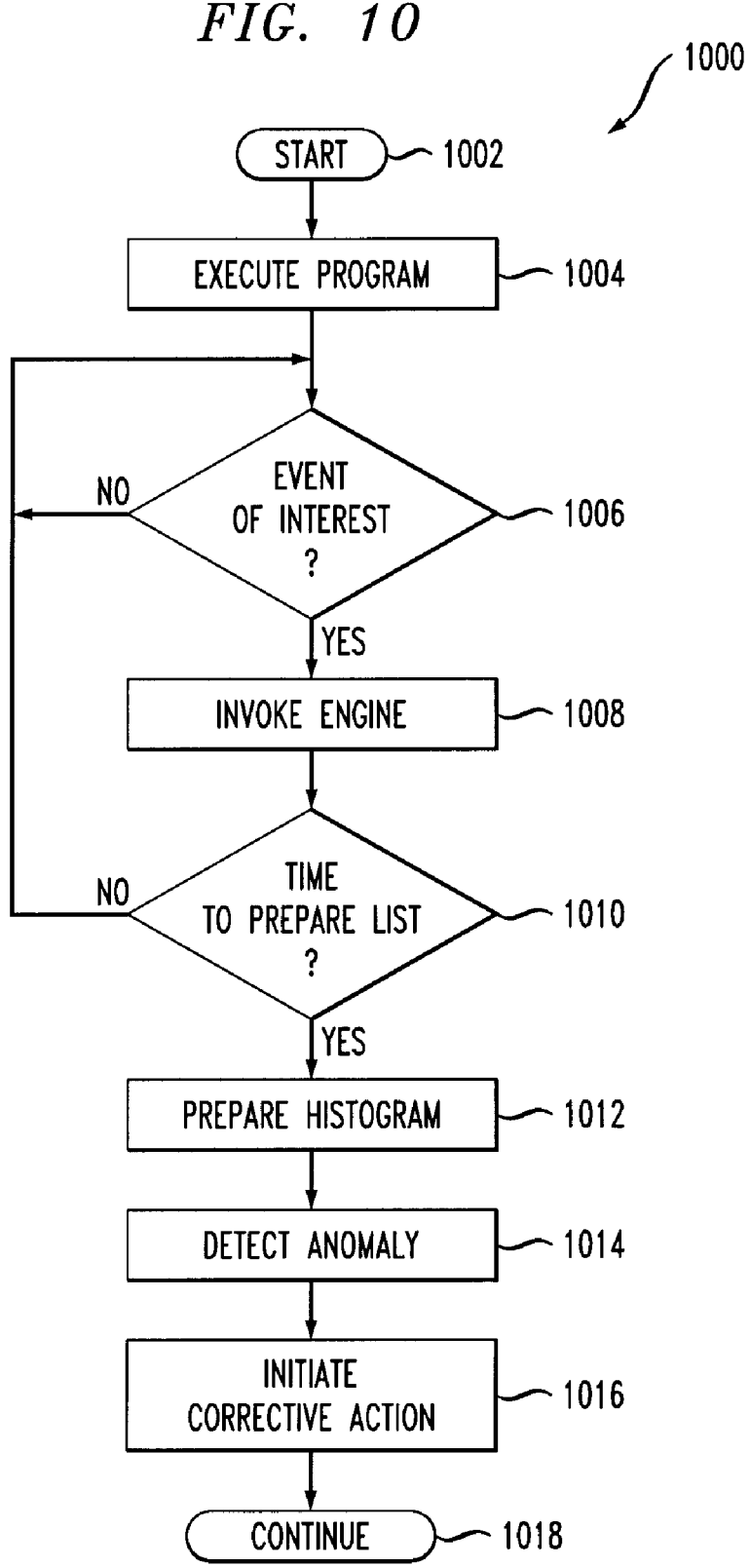
FIG. 10 is a flow chart of exemplary method steps, according to an additional aspect of the invention.

Reference should now be had to flow chart 1000 of FIG. 10, which begins with start block 1002. Given the discussion thus far, it will be appreciated that, in general terms, an exemplary method, according to an aspect of the invention, includes the step 1006 of detecting multiple occurrences of a plurality of different kinds of events of interest. Step 1008 includes, upon each of the occurrences, invoking an event tracking hardware engine 520 having N caches, N being at least two, using a key 106 of a type corresponding to a corresponding one of the kinds of events, such that the event tracking hardware engine stores, for each of the different kinds of events, a corresponding cumulative number of occurrences (referred to elsewhere herein as frequency). The storage is implemented by carrying out additional steps.

In some instances (e.g., first schema), the additional steps include searching in the N caches (preferably in parallel) for an entry for the key. If an entry for the key is found, and no overflow of the corresponding cumulative number of occurrences for the entry for the key would occur by incrementing the corresponding cumulative number of occurrences, the corresponding cumulative number of occurrences is incremented. If the entry for the key is found, and overflow of the corresponding cumulative number of occurrences for the entry for the key would occur by incrementing the corresponding cumulative number of occurrences, the entry is promoted from a given one of the caches in which the entry exists to a next highest cache. If the entry for the key is not found, enter the entry for the key in a zeroth one of the caches with the corresponding cumulative number of occurrences being initialized.

In other instances (e.g., second schema), the additional steps include searching in a zeroth one of the caches for an entry for the key. If an entry for the key is found in the zeroth one of the caches, and no overflow of the corresponding cumulative number of occurrences for the entry for the key would occur by incrementing the corresponding cumulative number of occurrences, increment the corresponding cumulative number of occurrences. If the entry for the key is found in the zeroth one of the caches, and overflow of the corresponding cumulative number of occurrences for the entry for the key would occur by incrementing the corresponding cumulative number of occurrences, promote the entry from the zeroth one of the caches in which the entry exists to a next highest cache. If the entry for the key is not found, enter the entry for the key in the zeroth one of the caches, with the corresponding cumulative number of occurrences being initialized.

The method and engine can be used for tracking any kind of events. One non-limiting exemplary application is for tracking events during program execution. Thus, an optional additional step includes executing a program on a computer processor 504, as per step 1004. A further optional step, as suggested by decision block 1010, includes periodically preparing a list of the events of interest together with the corresponding cumulative numbers of occurrences.

As per optional step 1012, in some instances, a histogram is prepared based on the list of events. In another aspect, the computer processor may be part of an autonomic computing system, and an additional step 1014 can include detecting at least one anomaly with the autonomic computing system, based on the list of the events. A further step 1016 includes facilitating initiation of corrective action to correct the at least one anomaly.

Processing continues at 1018.

The events of interest may include, for example, branch misses and/or cache misses. The keys can indicate whether a given one of the events is a branch miss or a cache miss, and can further indicate at least a corresponding instruction address, and optionally, a corresponding data address.

When, in the promoting step, the next cache is full, a victim entry can be selected in the next cache, as described above, to make room for the promoted entry.

The list prepared as a result of a "YES" in step 1010 can be ordered from the highest level cache to the lowest level cache, and within a given cache, from highest to lowest number of occurrences, as discussed above.

Figure 13:
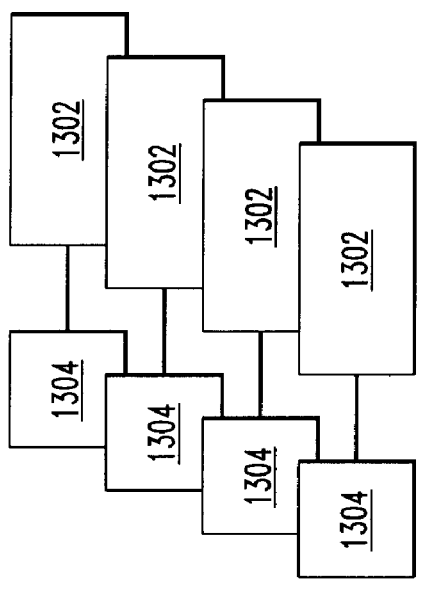
FIGS. 13 and 14 show an exemplary block logic diagram for the exemplary event tracking hardware.
Figure 14:
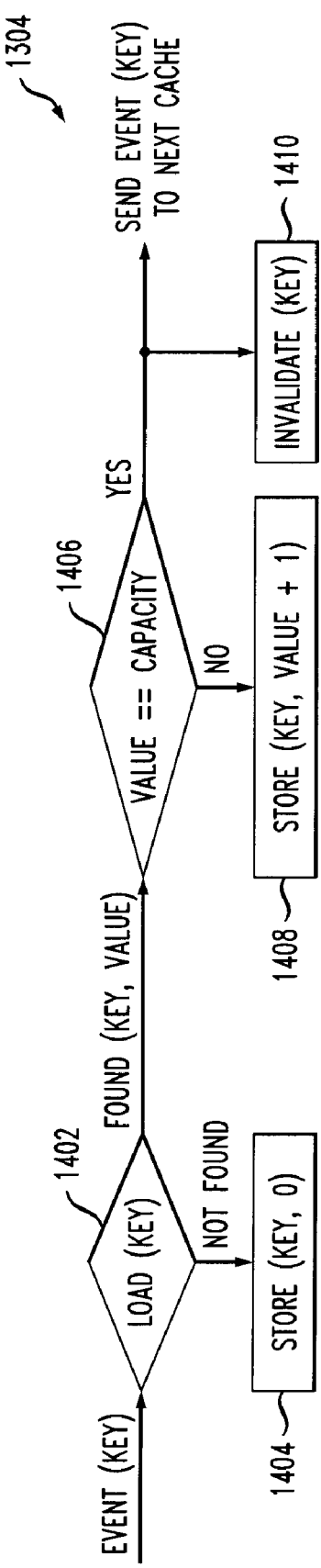

FIGS. 13 and 14 show an exemplary block logic diagram for event tracking hardware 520. The same includes a plurality of caches 1302 each with control logic 1304 which implements the logic shown in FIG. 14. As seen in decision block 1402, when an event is detected and the corresponding key is to be loaded into the given cache 1302, a determination is made as to whether the key is found in the cache. If the answer is no, as at 1404, store the key in that cache with a frequency of zero (zero being used to count, as in computer math). If the answer is yes, as at 1406, determine whether the currently stored value for the key is at capacity. If not, as at 1408, increment the frequency value for the stored key by one. If the answer is yes, send the key for the corresponding event to the next cache, and invalidate the entry for that key in the present cache, as at 1410.

Thus, in the exemplary embodiment, a copy of the logic in FIG. 14 is positioned in front of each cache 1302 and it takes the event information and accesses the cache as described in the flow chart of FIG. 14. The interface to a standard cache is per se well-known to the skilled artisan and implements three functions, namely, load, store and invalidate; these are seen in FIG. 13 as 1402, 1404/1408, and 1410, respectively.

Caches 1302 may be any standard type of cache while control logic 1304 can be implemented, for example, in custom digital logic circuitry (any family of logic).

Thus, in another aspect, an exemplary embodiment of an event tracking engine apparatus includes a plurality of caches 1302 and a corresponding plurality of control circuits 1304. The plurality of caches and the corresponding plurality of control circuits are cooperatively configured to receive (e.g., intercept) indications of multiple occurrences of a plurality of different kinds of events of interest. The indications are received (and tracked) as keys 106. The plurality of caches and the corresponding plurality of control circuits are cooperatively configured to store a corresponding cumulative number of occurrences for each of the different kinds of events of interest, by carrying out the above-mentioned additional steps (e.g., schema one or schema two) upon receipt of each given one of the keys.

Design Structure Aspects

Figure 11:
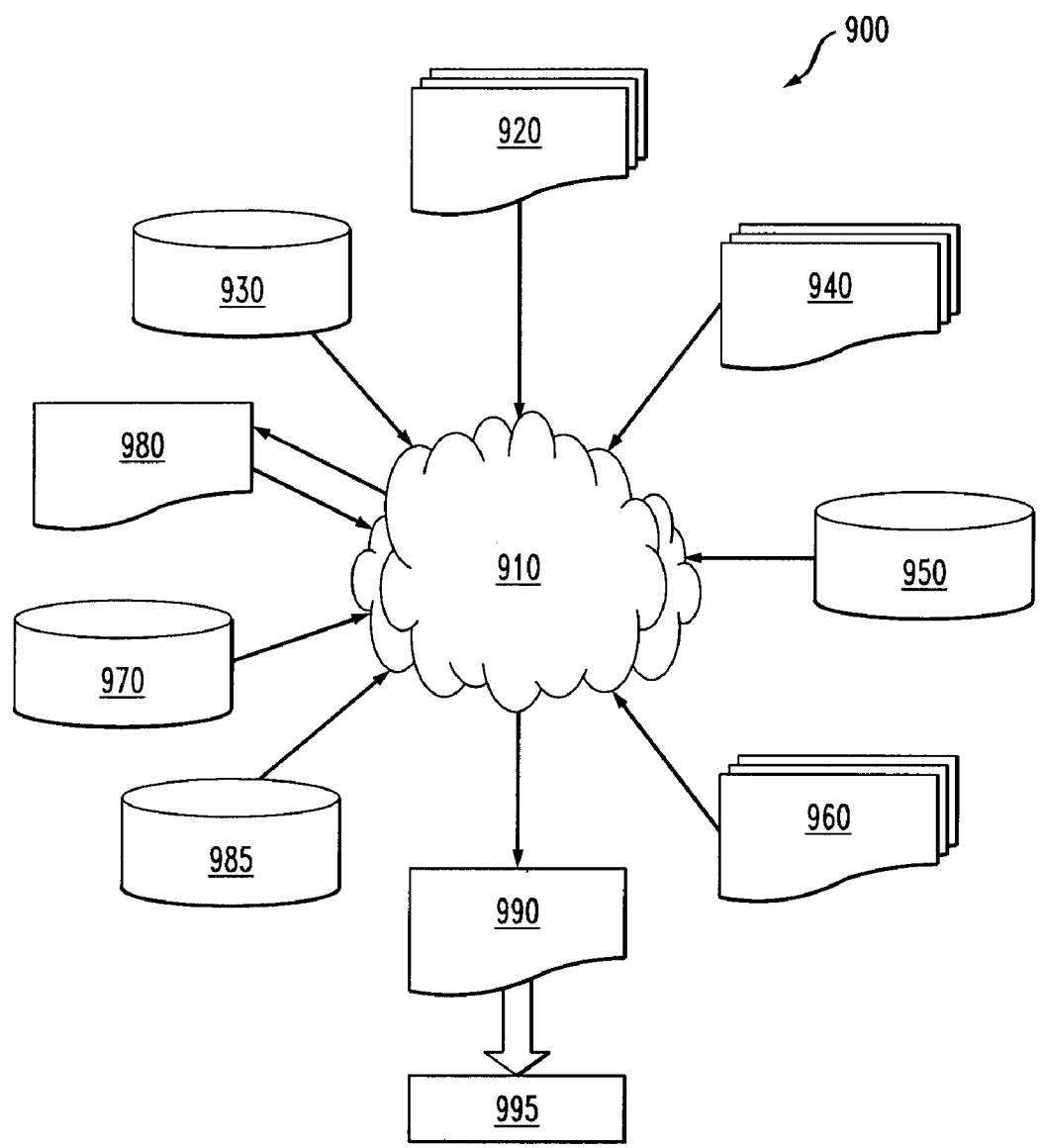
FIG. 11 is a flow diagram of a design process used in semiconductor design, manufacture, and/or test.

FIG. 11 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1, 5-10, 13, and 14. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1, 5-10, 13, and 14. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1, 5-10, 13, and 14 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means. Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 5-10, 13, and 14. In one embodiment, design structure 990 may comprise a compiled, executable HDL simulation model that functionally simulates the devices shown in FIGS. 1, 5-10, 13, and 14.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 5-10, 13, and 14. Design structure 990 may then proceed to a stage 995 where, for example, design structure 990: proceeds to tape-out, is released to manufacturing, is released to a mask house, is sent to another design house, is sent back to the customer, etc.

Exemplary System and Article of Manufacture Details

A variety of techniques, utilizing dedicated hardware, general purpose processors, firmware, software, resident software, micro-code, and so on, or a combination of the foregoing, may be employed to carry out the design process just described. The design process, for example, can make use of software running on a general purpose computer or workstation. Some instances can employ a computer product including a computer readable medium with computer usable program code for performing steps, and/or an apparatus including a memory and at least one processor that is coupled to the memory and operative to perform steps. The event tracking per se, as shown in FIGS. 1, 5-10, 13, and 14, is implemented in hardware.

As will be appreciated by one skilled in the art, and as alluded to in the previous paragraph, some aspects of the design process may be embodied as a system, method or computer program product.

Some aspects of the design process, or elements thereof, can be implemented in the form of an apparatus including a memory and at least one processor that is coupled to the memory and operative to perform exemplary design process steps.

Figure 12:
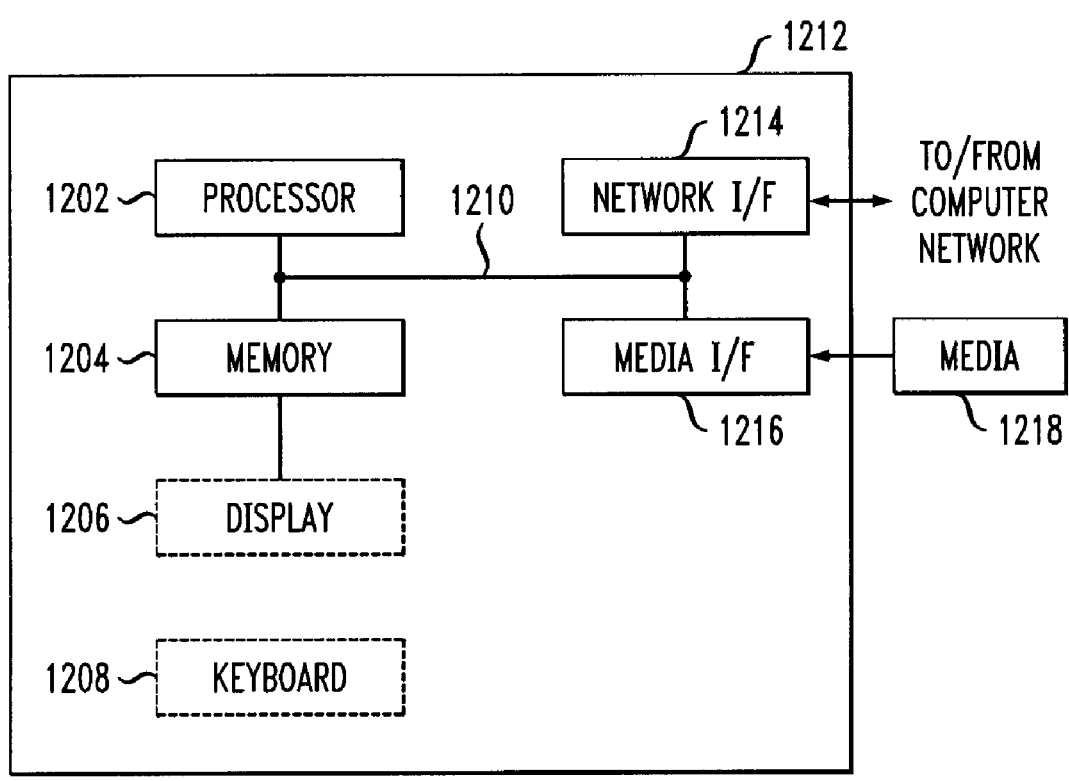
FIG. 12 depicts a computer system that may be useful in implementing one or more aspects and/or elements of the invention.

Some design process aspects can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used with respect to FIG. 12, is intended to include any processing device, such as, for example, one that includes a CPU (central processing unit) and/or other forms of processing circuitry. Further, in the context of FIG. 12, the term "processor" may refer to more than one individual processor, and the term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used with respect to FIG. 12, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the design process, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the design process may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the design process may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the design process are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, as to the design process, can be implemented by computer program instructions. Again, the event tracking hardware 520 is implemented in hardware. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks for the design process.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The system of FIG. 12 is also a non-limiting example of a computer system having a processor that could generate events to be tracked.

Given the teachings of the invention provided herein, one of ordinary skill in the related art will be able to contemplate other implementations of the components of the invention and/or the design process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
   detecting multiple occurrences of a plurality of different kinds of events of interest;
   upon each of said occurrences, invoking an event tracking hardware engine having N caches, N being at least two, using a key of a type corresponding to a corresponding one of said different kinds of events of interest, such that said event tracking hardware engine stores, for each of said different kinds of events of interest, a corresponding cumulative number of occurrences, by carrying out the following steps:
   searching in said N caches for an entry for said key;
   if an entry for said key is found, and no overflow of said corresponding cumulative number of occurrences for said entry for said key would occur by incrementing said corresponding cumulative number of occurrences, incrementing said corresponding cumulative number of occurrences;
   if said entry for said key is found, and overflow of said corresponding cumulative number of occurrences for said entry for said key would occur by incrementing said corresponding cumulative number of occurrences, promoting said entry from a given one of said N caches in which said entry exists to a next highest one of said N caches; and
   if said entry for said key is not found, entering said entry for said key in a zeroth one of said N caches with said corresponding cumulative number of occurrences being initialized.

2. The method of claim 1, further comprising periodically preparing a list of said different kinds of events of interest together with said corresponding cumulative numbers of occurrences.

3. The method of claim 2, further comprising preparing a histogram based on said list of said different kinds of events of interest.

4. The method of claim 2, further comprising executing a program on a computer processor, wherein said different kinds of events of interest are events associated with execution of said program.

5. The method of claim 4, wherein said computer processor is part of an autonomic computing system, further comprising:
  detecting at least one anomaly with said autonomic computing system, based on said list of said different kinds of events of interest; and
  facilitating initiation of corrective action to correct said at least one anomaly.

6. The method of claim 4, wherein said different kinds of events of interest comprise at least branch misses and cache misses.

7. The method of claim 6, wherein said keys indicate whether a given one of said different kinds of events of interest comprises a branch miss or a cache miss, and further indicate at least a corresponding instruction address.

8. The method of claim 7, wherein said keys further indicate a corresponding data address.

9. The method of claim 2, wherein said list is ordered from a highest level one of said N caches to a lowest level one of said N caches, and from highest to lowest number of occurrences within a given one of said N caches.

10. The method of claim 2, further comprising when, in said promoting step, said next highest one of said N caches is full, selecting a victim entry in said next highest one of said N caches to make room for said promoted entry.

11. A method comprising the steps of:
  detecting multiple occurrences of a plurality of different kinds of events of interest;
  upon each of said occurrences, invoking an event tracking hardware engine having N caches, N being at least two, using a key of a type corresponding to a corresponding one of said different kinds of events of interest, such that said event tracking hardware engine stores, for each of said different kinds of events of interest, a corresponding cumulative number of occurrences, by carrying out the following steps:
    searching in a zeroth one of said N caches for an entry for said key;
    if an entry for said key is found in said zeroth one of said N caches, and no overflow of said corresponding cumulative number of occurrences for said entry for said key would occur by incrementing said corresponding cumulative number of occurrences, incrementing said corresponding cumulative number of occurrences;
    if said entry for said key is found in said zeroth one of said N caches, and overflow of said corresponding cumulative number of occurrences for said entry for said key would occur by incrementing said corresponding cumulative number of occurrences, promoting said entry from said zeroth one of said N caches in which said entry exists to a next highest one of said N caches; and
    if said entry for said key is not found, entering said entry for said key in said zeroth one of said N caches with said corresponding cumulative number of occurrences being initialized.

12. The method of claim 11, further comprising periodically preparing a list of said different kinds of events of interest together with said corresponding cumulative numbers of occurrences.

13. The method of claim 12, further comprising preparing a histogram based on said list of said different kinds of events of interest.

14. The method of claim 12, further comprising executing a program on a computer processor, wherein said different kinds of events of interest are events associated with execution of said program.

15. The method of claim 14, wherein said computer processor is part of an autonomic computing system, further comprising:
  detecting at least one anomaly with said autonomic computing system, based on said list of said different kinds of events of interest; and
  facilitating initiation of corrective action to correct said at least one anomaly.

16. The method of claim 14, wherein said different kinds of events of interest comprise at least branch misses and cache misses.

17. The method of claim 16, wherein said keys indicate whether a given one of said different kinds of events of interest comprises a branch miss or a cache miss, and further indicate at least a corresponding instruction address.

18. The method of claim 17, wherein said keys further indicate a corresponding data address.

19. The method of claim 12, wherein said list is ordered from a highest level one of said N caches to a lowest level one of said N caches, and from highest to lowest number of occurrences within a given one of said N caches.

20. The method of claim 12, further comprising when, in said promoting step, said next highest one of said N caches is full, selecting a victim entry in said next highest one of said N caches to make room for said promoted entry.

21. An event tracking engine apparatus comprising:
  a plurality of caches; and
  a corresponding plurality of control circuits;
  said plurality of caches and said corresponding plurality of control circuits being cooperatively configured to:
    receive indications of multiple occurrences of a plurality of different kinds of events of interest, said indications being received as keys;
    store a corresponding cumulative number of occurrences for each of said different kinds of events of interest, by carrying out the following steps upon receipt of each given one of said keys:
      searching in said caches for an entry for given one of said keys;
      if an entry for given one of said keys is found, and no overflow of said corresponding cumulative number of occurrences for said entry for given one of said keys would occur by incrementing said corresponding cumulative number of occurrences, incrementing said corresponding cumulative number of occurrences;
      if said entry for given one of said keys is found, and overflow of said corresponding cumulative number of occurrences for said entry for given one of said keys would occur by incrementing said corresponding cumulative number of occurrences, promoting said entry from a given one of said caches in which said entry exists to a next highest one of said caches; and if said entry for given one of said keys is not found, entering said entry for given one of said keys in a zeroth one of said caches with said corresponding cumulative number of occurrences being initialized.

22. The event tracking engine apparatus of claim 21, wherein said plurality of caches and said corresponding plurality of control circuits are cooperatively configured such that, in said promoting step, if said next highest one of said caches is full, a victim entry is selected in said next highest one of said caches to make room for said promoted entry.

23. An event tracking engine apparatus comprising:
a plurality of caches; and
a corresponding plurality of control circuits;
said plurality of caches and said corresponding plurality of control circuits being cooperatively configured to:
receive indications of multiple occurrences of a plurality of different kinds of events of interest, said indications being received as keys;
store a corresponding cumulative number of occurrences for each of said different kinds of events of interest, by carrying out the following steps upon receipt of each given one of said keys:
searching in a zeroth one of said caches for an entry for said given one of said keys;
if an entry for said given one of said keys is found in said zeroth one of said caches, and no overflow of said corresponding cumulative number of occurrences for said entry for said key would occur by incrementing said corresponding cumulative number of occurrences, incrementing said corresponding cumulative number of occurrences;
if said entry for said given one of said keys is found in said zeroth one of said caches, and overflow of said corresponding cumulative number of occurrences for said entry for said given one of said keys would occur by incrementing said corresponding cumulative number of occurrences, promoting said entry from said zeroth one of said caches in which said entry exists to a next highest one of said caches; and
if said entry for said given one of said keys is not found, entering said entry for said given one of said keys in said zeroth one of said caches with said corresponding cumulative number of occurrences being initialized.

24. The event tracking engine apparatus of claim 23, wherein said plurality of caches and said corresponding plurality of control circuits are cooperatively configured such that, in said promoting step, if said next highest one of said caches is full, a victim entry is selected in said next highest one of said caches to make room for said promoted entry.

* * * * *